US012468473B2

(12) United States Patent
Jaser et al.

(10) Patent No.: US 12,468,473 B2
(45) Date of Patent: Nov. 11, 2025

(54) SYSTEM AND METHOD FOR CENTRALIZED MANAGEMENT OF WORKLOAD AND PARALLEL SERVICE OF PRIORITIZED REQUESTS

(71) Applicant: Microchip Technology Incorporated, Chandler, AZ (US)

(72) Inventors: Ihab Jaser, San Jose, CA (US); Jack Wynne, Los Altos, CA (US); Kwok Kong, Cupertino, CA (US); Donia Sebastian, Fair Oaks, CA (US); Xin Guo, San Jose, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 76 days.

(21) Appl. No.: 17/903,177

(22) Filed: Sep. 6, 2022

(65) Prior Publication Data

US 2023/0115296 A1    Apr. 13, 2023

Related U.S. Application Data

(60) Provisional application No. 63/253,971, filed on Oct. 8, 2021.

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0659; G06F 3/0688; G06F 3/061
USPC .................................................... 711/154
See application file for complete search history.

(56) References Cited

U.S. PATENT DOCUMENTS

| 6,154,769 | A  | 11/2000 | Cherkasova et al. ......... 709/207 |
| 10,728,166 | B2 | 7/2020 | Balakrishnan et al. |
| 2012/0069034 | A1 | 3/2012 | Biswas et al. ................ 345/531 |
| 2012/0278530 | A1 | 11/2012 | Ebsen .......................... 711/103 |

(Continued)

FOREIGN PATENT DOCUMENTS

CN    109819336 B  * 12/2020

OTHER PUBLICATIONS

International Search Report and Written Opinion, Application No. PCT/US2022/046012, 13 pages, Jan. 13, 2023.

*Primary Examiner* — Mardochee Chery
(74) *Attorney, Agent, or Firm* — SLAYDEN GRUBERT BEARD PLLC (57) ABSTRACT

An apparatus and method for scheduling memory requests including receiving a plurality of requests having a type and associating each request of the received plurality of requests with a corresponding target, which is associated with one channel of a plurality of channels. The method assigning a priority to each request, assigning a utilization cost to each request based on the request's target and request type, and queueing each request of the plurality of requests for scheduling. The method selecting a first request of the received plurality of requests to be scheduled based on its priority, scheduling the first request for processing at a time when the first request utilization cost is less than or equal to a current value of a dynamic utilization counter, and debiting the dynamic utilization counter by the first request utilization cost.

20 Claims, 5 Drawing Sheets

(56) References Cited

U.S. PATENT DOCUMENTS

2017/0265148 A1* 9/2017 Balasubramanian ........................ H04W 52/146
2021/0182190 A1 6/2021 Gao et al.

* cited by examiner

SYSTEM AND METHOD FOR CENTRALIZED MANAGEMENT OF WORKLOAD AND PARALLEL SERVICE OF PRIORITIZED REQUESTS

This application claims priority to U.S. provisional patent application Ser. No. 63/253,971 filed Oct. 8, 2021, the contents of which are herein incorporated by reference in their entirety.

FIELD OF THE INVENTION

The present application relates to scheduling tasks and, more particularly, to increasing utilization of resources while maintaining performance targets.

BACKGROUND

Flash memory storage devices consume significant power and may be capable of performing more operations in a given time interval than the power envelope for the device may allow for safe and reliable operation. Further, flash memory storage devices are sold with performance guarantees. Existing scheduling approaches resulted in suboptimal performance or inability to meet satisfy performance guarantees.

SUMMARY

In some examples, an apparatus is provided comprising: a plurality of channels, each channel having communication lines for controlling a plurality of targets; a dynamic utilization counter; a storage controller circuit, and a request schedule circuit. The storage controller circuit is to receive a plurality of requests, each request having a request type, associate each request of the received plurality of requests with a corresponding target of the plurality of targets, the corresponding target associated with one of the plurality of channels, assign a priority to each request of the received plurality of requests, assign a utilization cost to each request of the received plurality of requests based on the request's associated target and request type, and queue each request of the plurality of requests for scheduling. The request scheduler circuit is to select a first request to be scheduled based on the assigned priority of the first request, schedule the first request for processing at a time when the first request assigned utilization cost is less than or equal to a current value of a dynamic utilization counter, and debit the dynamic utilization counter by the first request utilization cost. In some examples, the apparatus comprises a plurality of queues, each corresponding to one priority, wherein the request scheduler circuit uses a weighted round robin algorithm to determine a next one of the plurality of queues from which a next scheduled request will be drawn, and the storage controller circuit to replenish the next one of the plurality of queues with a next request from the received plurality of requests having a corresponding priority. In some examples, the apparatus comprises a second request queued in an original one of the plurality of queues, the storage controller circuit is to change the priority of the second request to a new priority, assign the second request to a different one of the plurality of queues based on the new priority, and invalidate entry the original one of the plurality of queues that correspond to the second request. In some examples, the storage controller circuit to determine a high temperature condition and, responsive to that determination, decrement the dynamic utilization counter. In some examples the apparatus comprises an arbitration circuit including a plurality of target selectors, wherein each target selector is associated with one of the plurality of channels, includes an input for each target associated with the corresponding channel, and includes a target selection input common to all target selectors; a channel selector including an input coupled to an output of each target selector and including a channel selection input; and a router with an input coupled to the output of the channel selector for receiving an incoming one of the plurality of requests and routing that incoming one of the plurality of requests to one of the plurality of queues matching the request priority. In some examples, the arbitration circuit rotates the target selection input and the channel selection input to distribute requests across channels and targets.

In some examples, a circuit-implemented method is provided comprising receiving a plurality of requests, each request having a request type; associating each received request of the received plurality of requests with a corresponding target of a plurality of targets, the corresponding target associated with one channel of a plurality of channels; assigning a priority to each request of the received plurality of requests; assigning a utilization cost to each request of the received plurality of requests based on the request's target and request type; queueing each request of the plurality of requests for scheduling; selecting a first request of the received plurality of requests to be scheduled based on the priority of the first request, scheduling the first request for processing at a time when the first request utilization cost is less than or equal to a current value of a dynamic utilization counter, and debiting the dynamic utilization counter by the first request utilization cost. In some examples, scheduling the first request uses a weighted round robin algorithm to determine a next one of the plurality of queues from which a next scheduled request will be drawn, and the method comprises replenishing the next one of the plurality of queues with a next request from the received plurality of requests having the same priority as the first request. In some examples the method comprises queueing a second request to be scheduled into a second queue of the plurality of queues based on a priority of the second request; changing the priority of the second request to a new priority; assigning the second request to a different one of the plurality of queues based on the new priority; and removing the second request from the second queue. In some examples the method comprises determining a high temperature condition and responsive determination decrementing the dynamic utilization counter. In some examples the method comprises before replenishing the next one of the plurality of queues, selecting a target output and a channel from which to draw a next request to be queued. In some examples the method comprises periodically rotating the target output and channel draw requests from all channels and targets.

In some examples a controller is provided comprising a processor and a memory comprising instructions. The instructions, when executed on the processor, receive a plurality of requests, each request having a request type; associate each request of the received plurality of requests with a corresponding target of a plurality of targets, the corresponding target associated with a corresponding channel of a plurality of channels; assign a priority to each request of the received plurality of requests; assign a utilization cost to each request of the received plurality of requests based on the request type; queue each request of the plurality of requests for scheduling; select a first request of the received plurality of requests to be scheduled based on the priority of the first request, schedule the first request for processing at a time when the first request utilization cost is less than or equal to a current value of a dynamic utilization counter, and debit the dynamic utilization counter by the first request utilization cost. In some examples, the instructions to schedule a request use a weighted round robin algorithm to determine a next one of the plurality of queues from which a next scheduled request will be drawn, and additional instructions replenish the next one of the plurality of queues with a next request from the received plurality of requests having a corresponding priority. In some examples, the instructions queue a second request to be scheduled into a second queue of the plurality of queues based on a priority of the second request; change the priority of the second request to a new priority; assign the second request to a different one of the plurality of queues based on the new priority; and remove the second request from the second queue. In some examples, the instructions determine a high temperature condition and responsive to that determination decrement the dynamic utilization counter. In some examples, the instructions to queue each request comprise before replenishing the next one of the plurality queues, select a target output and a channel from which to draw a next request to be queued. In some examples, the instructions periodically rotate the target output and channel draw requests from all channels and targets. In some examples, the instructions to receive a plurality of requests into the memory queue requests to be scheduled in a data structure representing multiple priority queues. In some examples, each target is associated with a type of memory and wherein the instructions to assign a utilization cost to each request of the received plurality of requests is based on the request type and the type of memory for the target corresponding to the request.

DETAILED DESCRIPTION

The present disclosure presents examples of systems and methods for centralized management of workload and parallel service of prioritized requests. For example, a storage controller may assign a priority and a cost to units of work that may be performed in parallel by a number of components. An arbitration circuit may distribute the workload across the working components and a priority scheduler may enforce prioritization policies specific to the application. Further, the priority scheduler may include a dynamic counter for managing overall output within a performance envelope. For example, a non-volatile memory storage controller may prioritize certain requests over other requests to satisfy performance guarantees. Some applications may value fast read times over other metrics and may therefore prioritize read requests ahead of write or erase requests. In addition, each request may have a unitized or unitless cost that varies based on the request type and the target memory type. For example, a read from one type of flash memory technology may consume two units of power whereas an erase of another type of flash memory in the same storage system may consume twenty units of power. The non-volatile memory storage controller may limit the number of simultaneous requests to manage power within a performance envelope driven by, for example, thermal guidelines or power supply limitations.

Figure 1A:
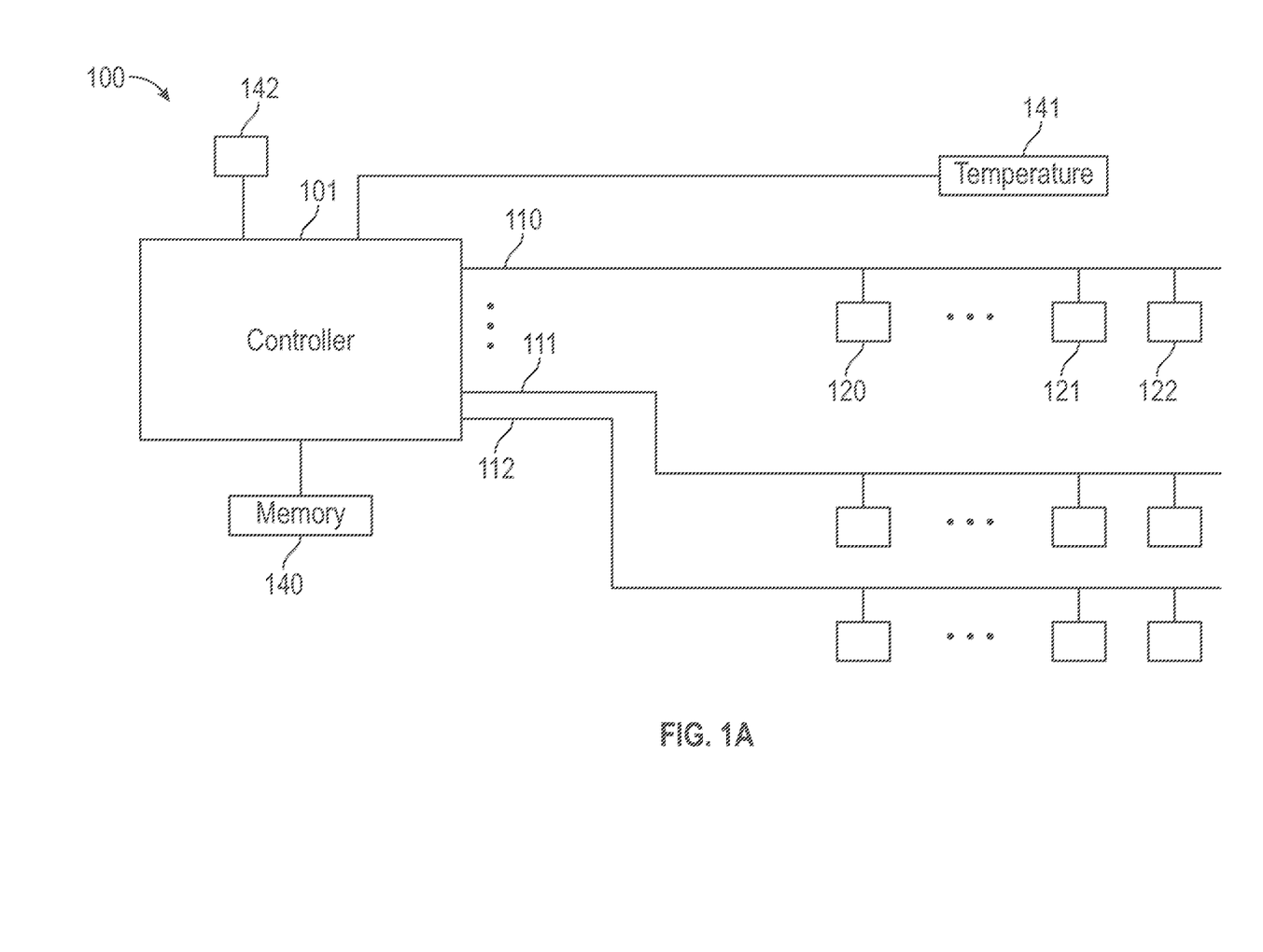
FIG. 1A is an illustration of a system for scheduling tasks in a flash-based storage system, according to examples of the present disclosure.

FIG. 1A is an illustration of a non-volatile memory storage system, according to examples of the present disclosure.

The system may be implemented in any suitable manner, such as by a device, die, chip, analog circuitry, digital circuitry, configurable digital logic, instructions for execution by a processor, or any combination thereof. The system may be implemented by, for example, a microcontroller and a sensor. Although some portions of the system are described herein as implemented by the microcontroller, such portions may be implemented instead by the sensor or by instrumentation coupling the microcontroller and the sensor. Similarly, although some portions of the system are described herein as implemented by the sensor, such portions may be implemented instead by the microcontroller or by instrumentation coupling the microcontroller and the sensor. Moreover, instead of a microcontroller, the system may be implemented by a server, computer, laptop, or any other suitable electronic device or system. In some examples, the system may be implemented hardware using a register-transfer level (RTL) design abstraction allowing for high performance processing of transactions.

Non-volatile memory storage system 100 includes storage controller circuit 101 connected to a set of channels (110, 111, and 112) with each channel connected to corresponding addressable non-volatile memories such as flash targets (e.g., 120, 121, 122). Storage controller circuit 101 may include bus interface circuitry and logic to communicate with one or more processors or devices in a computing system. Storage controller circuit 101 may accept requests from a central processing unit (CPU, not shown) to access data in flash memory storage system 100. A request might be a read, write, or erase operation. Different operations may require different amounts work to accomplish. For example, a flash read operation may require an address lookup and a scan of a block of memory. A flash write operation may be more complicated because some flash memory technologies can only be written as an entire block, e.g., a block 2048-byte data area. A write to one byte of a 2048-byte block may require writing the entire 2048-byte block. Further, non-volatile memories may wear out after a number of write operations have been performed. Storage controller circuit 101 may choose to distribute write operations across unused memory blocks in a process called wear leveling. In that process a write to a logical memory block mapped to physical block A may be performed on physical block B and after the successful write the storage controller circuit will update an internal table mapping subsequent reads of that logical block to read from physical block B. In another example, a read request may include a logical block identifier specifying a logical block to be read from one of the addressable non-volatile memories and a destination memory location in RAM (not shown). Storage controller circuit 101 may translate the logical block identifier to a physical block identifier associated with a specific target attached to a channel, for example target 120 attached to channel 110. Controller channel 110 may read data stored in the identified physical block of target 120 and storage controller circuit 101 may then write that block of data to the destination memory location via a direct memory access (DMA) operation over a system bus (not shown). Storage controller circuit 101 may then report completion of the request to the CPU.

Each of the set of channels (e.g., channel 110) may provide a communications channel to one or more non-volatile memory targets. For example, Channel 110 provides a communication channel to targets 120, 121, and 122. Channel 110 may select the target specified by storage controller circuit 101, e.g., target 121, and may execute a request on that target. Channel 110 may include, for example, a bidirectional 8-bit bus shared by each connected target. Channel 110 may also include addressable control lines to each connected target to allow channel 110 to select which target will interact with the bus for a given transaction. For example, channel 110 may erase a physical block of target 121 and then write a block of data to target 121 in a subsequent request. Controller channel 110 is configured to select target 121 by toggling one or more control lines on target 121. Controller channel 110 also communicates the physical block number over the bus, communicates the particular request type, and sources/sinks any data associated with that request over the bus. In a write request, channel 110 may signal a write is to be performed and identify the physical block to be written. Channel 110 may then wait until target 121 is ready to accept data to be written. Once target 121 is ready, channel 110 may sequentially provide the data to be written in units and at intervals accepted by target 121.

Each non-volatile memory target may be implemented with a particular cell architecture such as single level cell (SLC) or multilevel cell (MLC) flash memory. Each cell in an SLC flash target stores a single binary digit (or bit) whereas each cell in an MLC flash target stores multiple bits. A common MLC is a quad level cell (QLC), which stores four bits per cell. SLC targets have the fastest read/write/erase times, have the longest lifespan, are the most reliable, and operate under the broadest temperature range of flash targets, but SLC targets are expensive and have smaller capacities (i.e., they have a lower bit density than MLC targets). MLC targets may have reduced performance characteristics but provide higher capacities than SLC targets because of their higher bit-densities. Further, certain operations consume more power in an MLC target than in an SLC target. For example, Table 1 lists illustrative utilization costs. These unitless values are intended to capture or reflect relative power consumption as a function of request type and technology type. Storage controller circuit 101 may associate each target with a type, e.g., SLC or QLC. The target type may be more granular and may be associated with a particular generation of flash memory by a particular manufacturer if experimental data shows power consumption or heat generation for that class of part differs from other parts of the same cell type.

TABLE 1

Utilization Cost

| Request Type | SLC | QLC |
| --- | --- | --- |
| Read | 2 | 5 |
| Write | 7 | 10 |
| Erase | 15 | 20 |

Non-volatile memory storage system 100 may have a power consumption envelope to avoid overloading a power supply and/or to maintain an operating temperature within a design envelope. In some examples, each target may have a power consumption envelope to maintain an operating temperature for that target or its die within a design envelope. Storage controller circuit 101 may include an input from one or more sensors. Storage controller circuit 101 may include an input from temperature sensor 141. Storage controller circuit 101 may include a programmable temperature set point and may vary request scheduling to maintain the system temperature below that set point. Storage controller circuit 101 may include an input from current sensor 142 to measure dynamic power consumption by system 100. In some examples, current sensor 142 may measure the voltage drop across a known resistance to calculate the current. In other examples, current sensor 142 may measure the voltage of the power supply to system 100. A drop in the input supply voltage may indicate the current draw by system 100 exceeds the power supply capacity or may provide a proxy for the current consumed by system 100. Storage controller circuit may include a programmable set point and may vary request scheduling to maintain the current consumption below that set point.

Flash memory storage system 100 may also have other design constraints. For example, flash memory storage system 100 may be sold with a guarantee that a specific percentage of reads (e.g., 99.999%) will be completed in less than a specified time (e.g., 5 milliseconds). However, request processing time may vary based on request type and target architecture. Table 2 lists illustrative processing times. In some examples, storage controller circuit 101 may be configured to prioritize certain request types to assist in meeting performance guarantees. Table 3 lists prioritizations according to some examples of the disclosed system.

TABLE 2

Request Processing Time

| Request Type | SLC | QLC |
| --- | --- | --- |
| Read | 5 ms | 8 ms |
| Write | 8 ms | 15 ms |
| Erase | 20 ms | 35 ms |

TABLE 3

Request Priorities

| Request Type | Priority | Scheduling Weight |
| --- | --- | --- |
| SLC Read | 0 | 15 |
| SLC Write | 2 | 8 |
| SLC Erase | 4 | 2 |
| QLC Read | 1 | 10 |
| QLC Write | 3 | 5 |
| QLC Erase | 5 | 1 |

Each target (e.g., 120, 121, or 122) may be a separate die or portion of a die and may be packaged with other targets in a chip. In some examples, each target is implemented in a single flash architecture. In some examples, one channel (e.g., channel 110) may be associated with targets in different flash architectures. Target 120 may be SLC whereas targets 121 and 122 may be QLC.

In some examples, a firmware memory (not shown) associated with storage controller circuit 101 may specify the number of channels, the number and types of targets attached to each channel, request costs, and request priorities discussed in this disclosure.

Figure 1B:
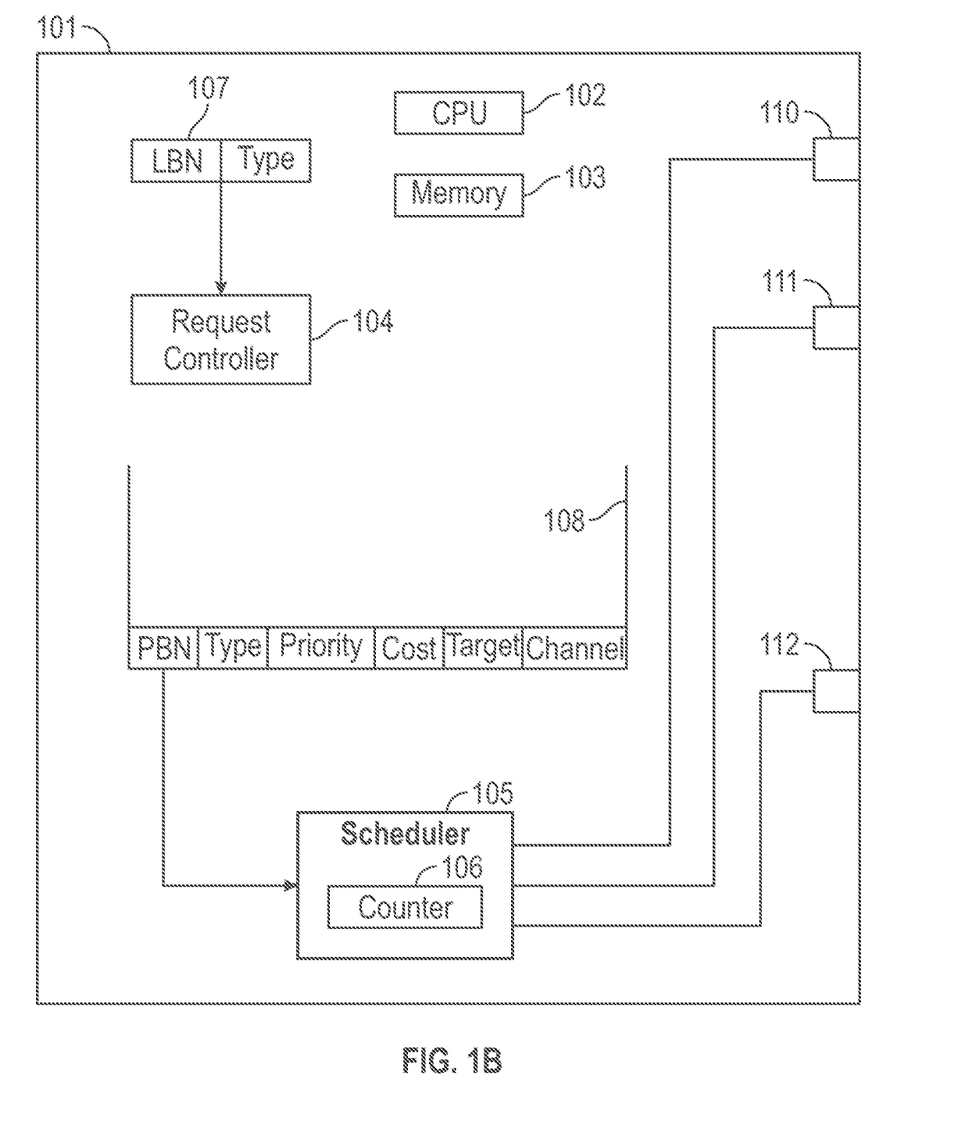
FIG. 1B is an illustration of a storage controller, according to examples of the present disclosure.

FIG. 1B is an illustration of a storage controller, according to examples of the present disclosure. Storage controller 101 may include processor 102 and memory 103. Memory 103 may contain instructions that when executed on processor 102 implement the functions of storage controller 101. Memory 103 may also contain data structures representing requests and implementing the arbitration circuits and queues described herein. Storage controller 104 may include a request controller for receiving storage access requests 107 from an external source (e.g., a data processing system coupled to storage controller 101 over a system bus). Storage requests 107 include a logical address or logical block number (LBN) and a request type. Request controller 104 processes each incoming request to generate a corresponding request entry 109 in request queue 108. Request entry 109 includes a physical address or physical block number (PBN) generated by request controller 104 either addressing a physical block containing requested data or a physical block selected for storing new or modified data. This translation as described above in the context of wear-levelling. Request entry 109 also includes a target identifier and a channel identifier specifying a channel controller in communication with the target associated with the LBN. In some examples, the target identifier field may be unnecessary if request entries are stored in target-specific queues. In some examples, the channel identifier field may be unnecessary if request entries are stored in channel-specific queues. Request controller 104 also provides a priority and cost value for each request entry to be used in scheduling the requests for processing. Scheduler 105 includes counter 106 and logic to perform the arbitration and scheduling of request entries. Scheduler 105 may schedule a request entry by sending that entry to the corresponding channel controller (110, 111, or 112), which may include a state machine for interacting with the target corresponding to the request entry. Queue 108 may operate as a modified first in first out (FIFO) queue allowing schedule 105 to retrieve the oldest request matching specified criteria, for example matching specified channel and target, and priority values. Queue 108 may be implemented as a set of queues each containing only requests associated with a particular channel and target.

Figure 2:
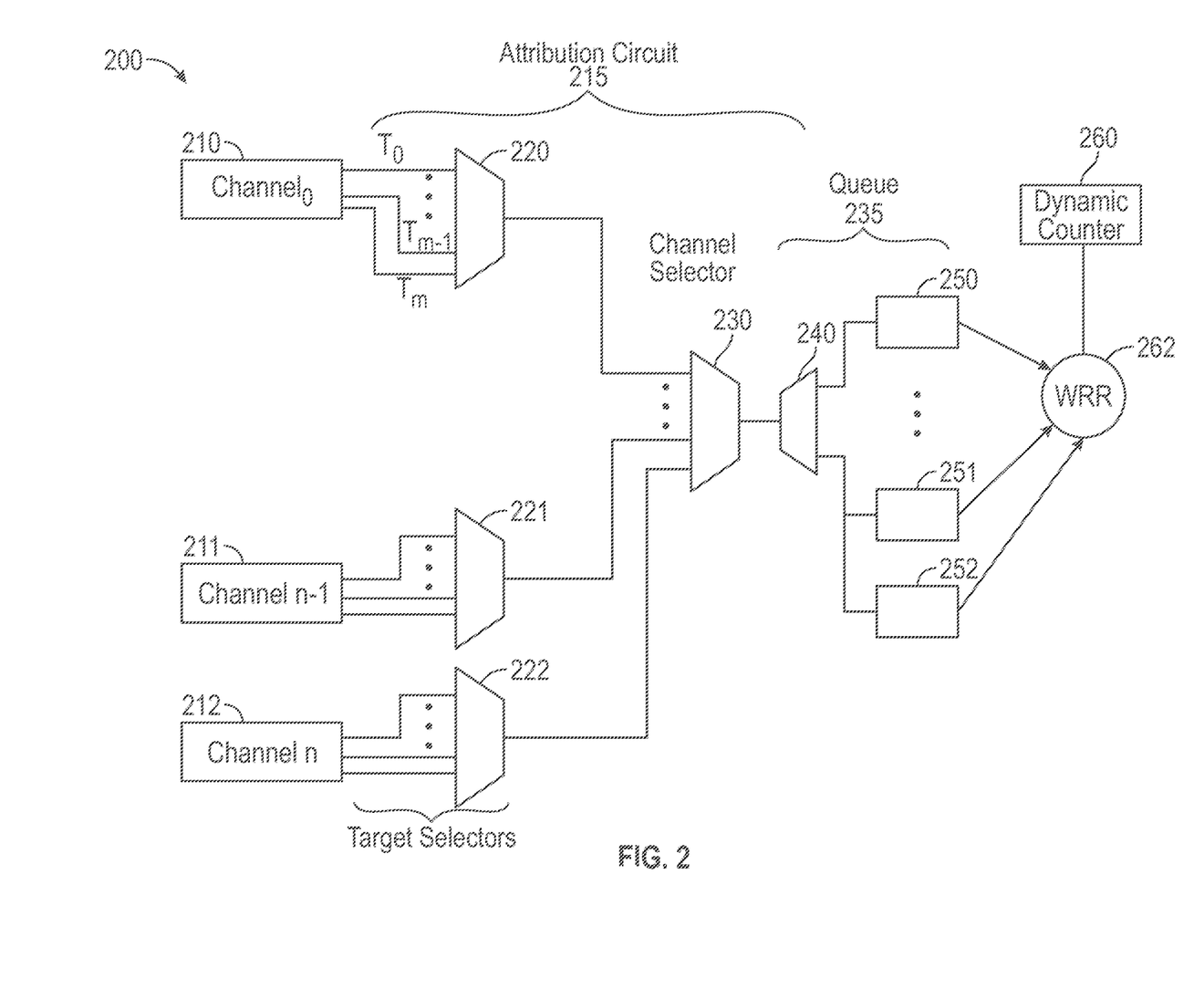
FIG. 2 is an illustration of a scheduling circuit, according to examples of the present disclosure.

FIG. 2 is an illustration of a scheduling circuit, according to examples of the present disclosure. Scheduling circuit 200 includes channels identified as channel 0 through channel n-1 and channel n identified as 210, 211, and 212, respectively. Each channel is configured to issue and manage requests for each of its associated targets via target outputs labeled $T_0 \ldots T_{m-1}$, and $T_m$, each target output corresponding to one associated target. A target output may be a first in first out (FIFO) queue of requests to execute an operation on the corresponding target. In an arbitration cycle, arbitration circuit 215 advances one request from one target output of the channels to queue 235. Arbitration circuit 215 may include target selectors 220, 221, and 222 and channel selector 230. Target selectors 220, 221, and 222 include inputs corresponding to the target outputs $T_0 \ldots T_{m-1}$, and $T_m$ for selecting one target output to pass to one input of channel selector 230. Target selector 220 may select a target output over one or more arbitration cycles in a manner that nearly evenly distributes workloads across targets of the channel. This nearly even distribution of workloads may distribute heat or current draw across those targets. Channel selector 230 selects from the available channels to provide a single request to queue 235. Channel selector 230 may select requests across channels to distribute workloads across channels. This distribution of workloads may distribute heat or current draw across all targets. Target selectors 220 and channel selector 230 are illustrated as multiplexers but may be implemented with data structures manipulated by software algorithms to perform the selection process.

In some examples, arbitration circuit 215 may be implemented with priority encoder stages to fairly arbitrate across many targets while advancing a request of a selected priority (which is discussed below with respect to queue 235). In some examples, the encoder priority (EV) value (e.g., SP={target[5:0], channel[3:0]}) may be determined by rotating target and channel values on a regular interval. In some examples, the EP value advances every four cycles. The EV value may be rotated each request selection iteration independent of the operation of queue 235. In these examples, if EV={target[000011 binary], channel[001 binary]}, then arbitration circuit 215 will attempt to schedule the next request for target 3 on channel 1. In some examples, if the selected target/channel combination does not have a pending request of the selected priority, target and channel selectors may scan other target/channel combinations until a request of the selected priority can be located and advanced to queue 235. In some examples, arbitration circuit 215 may comprise multiple stages of encoders to determine which request next propagates to the queue 235. Each stage may rotate to ensure fairness.

Queue 235 includes router 240 and a set of priority queues 250, 251, and 252, each corresponding to a specific request priority. Router 240 routes the selected request from channel selector 230 (and more generally, arbitration circuit 215) to the respective queue corresponding to the priority of the request. In some examples, priority queues 250, 251, and 252 may be shallow queues each with a single request entry. Scheduling circuit 200 fills priority queues 250, 251, and 252 with requests drawn from a target output selected by arbitration circuit 215. In other words, when a request from priority queue 250 is scheduled by scheduler circuit 262, scheduling circuit 200 attempts to refill priority queue 250 with a request of a corresponding priority from the target output identified by the current EV. If that target output does not have any pending requests of that corresponding priority, arbitration circuit 215 may advance EV or scan across other target outputs seeking a request of the desired priority.

In some examples, controller 101 may adjust the priority or cost of a request at any time before the request is scheduled. In certain examples, controller 201 may increase the priority of an existing request (ER) if it has aged more than a threshold amount of time. If arbitration circuit 215 advances a request that is already in another priority queue, that prior priority queue entry may be invalidated. In some examples, if controller 201 changes the priority of a queued request, the corresponding queue entry is invalidated, and the request is returned to the target output from which the request originated. In some examples, controller 201 may cancel a request at any time before the request is scheduled, for example to maintain cache consistency. If the cancelled request had been assigned to a priority queue, the corresponding priority queue entry may be invalidated. Selectors 220, 221, 220, and 230 are illustrated as encoders and router 240 is illustrated as a decoder, however one or more of these circuit elements may be implemented with data structures manipulated by software algorithms to perform the routing process.

Counter 260 may be a dynamic utilization counter representing the credits available within the current power window (or thermal window). In one example, counter 260 may be implemented as a leaky bucket with a refresh interval. In a leaky bucket example, an empty bucket drains as requests are scheduled and is refreshed on a regular interval. In another example, counter 260 may be implemented as a proxy for simultaneously active requests. In this example, each newly active request may decrement the counter in the amount of the request credit and completion of the request increment the counter in the same amount. Counter 260 may be altered dynamically separate from request scheduling representing a dynamic credit bucket. For example, a feedback-based control system may increment or decrement counter 260 to control the overall conditions of storage system 100. In some examples, a thermal sensor may be incorporated into storage system 100 to provide control feedback. If the thermal sensor reading is less than a predetermined thermal limit, storage controller circuit 101 may add to counter 260. Likewise, storage controller 101 may determine a high temperature condition, i.e., the thermal sensor reading exceeds the predetermined limit, and in response the storage controller circuit 101 may decrement counter 260. In some examples, the CPU (not shown) may signal to storage controller circuit 101 a reason to reduce power consumption such as when a system may be operating on limited battery power or when energy rates are high. Storage controller circuit 101 may reduce counter 260 to lower power consumption (and by extension the temperature) of storage system 100. In other examples, storage controller circuit 101 may measure current drawn by one or more flash targets to determine power consumption. Storage controller circuit 101 may increment counter 260 if power consumption is within a power consumption envelope and may decrement counter 260 if power consumption has exceeded that envelope. In some examples, counter 260 may hold a negative value and may prevent scheduling of any new requests until sufficient credits have been applied to counter 260 signaling return to lower power consumption, lower temperature, or completion of active requests.

Scheduler circuit 262 selects a request from one of the priority queues (i.e., 250, 251, and 252) whenever counter 260 has enough credit to perform the selected request (i.e., the cost of the selected request is no greater than the value of counter 260). Scheduler circuit 262 may implement a weighted round robin (WRR) algorithm to favor high priority requests without starving the lower priority queues. In some examples, scheduler circuit 262 may schedule requests according to a specified scheduling weight (e.g., that listed in Table 3). In a given cycle, scheduler circuit 262 may schedule up to fifteen SLC reads, eight SLC writes, two SLC erases, and so forth. The WWR algorithm may interleave or cluster requests within a cycle.

Figure 3:
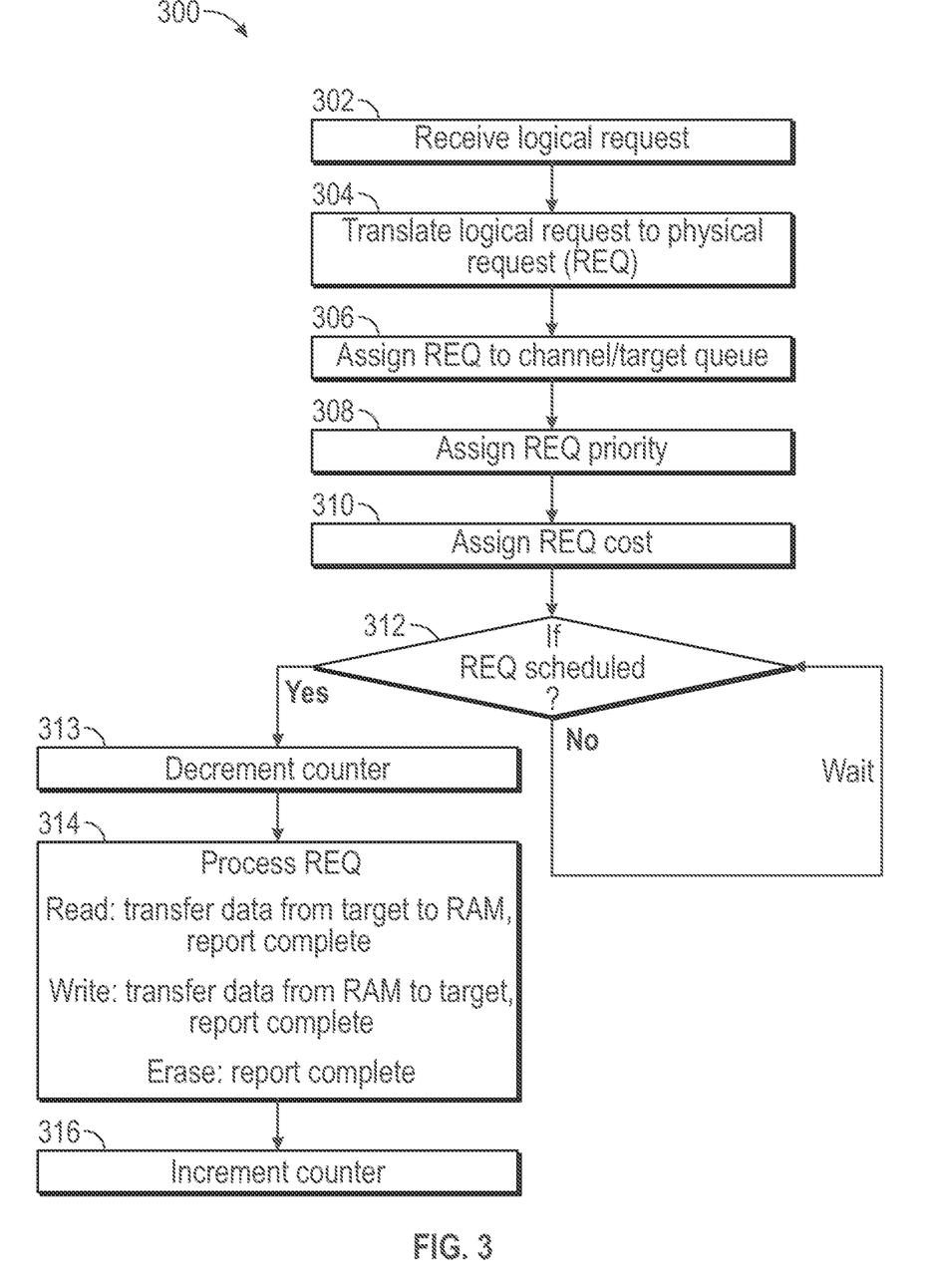
FIG. 3 is a flowchart of a method for handling requests, according to examples of the present disclosure.

FIG. 3 is a flowchart of a method for handling requests, according to examples of the present disclosure. Method 300 may begin with block 302 by receiving a logical storage request (i.e., a storage request referencing an LBN) at storage controller circuit 101. The request may include a logical block identifier, a type of request (e.g., read, write, or erase), and a DMA address for the source or destination in the computer's memory space (not shown) of the information to be written or read, respectively. At block 304, controller 101 may translate the logical block identifier into a physical block identifier associated with a specific target attached to a specific channel. This logical to physical address translation allows storage controller circuit 101 to perform wear leveling for flash memory targets. At block 306, storage controller circuit 101 may assign the request to a target and a channel corresponding to that target. Logical to physical address translation also enables bad block replacement and performance optimization by moving a frequently read block to a target with faster read times or one with lower read cost. At block 308, storage controller circuit 101 may assign the request a priority based at least in part on the request type and the target associated with the request. For example, a read request may receive a higher priority than a write request in an effort to achieve faster read times at the expense of slower write times. At block 310, storage controller circuit 101 may assign the request a cost based at least in part on the request type and the target associated with the request. The assigned cost may be a unitless proxy for some "cost" in processing the request. For example, the cost may represent the relative the time to completion of one type of request versus the others. A SLC read request might complete in one seventh the time of a QLC erase command. In another example, the cost may represent the relative energy expended in processing the request. A SLC flash read comment might consume one tenth the energy of a QLC erase command. In yet another example, the cost may represent the relative heat generated by each command.

At block 312, if scheduler circuit 262 has not yet selected the request for scheduling, wait on this request. Storage controller circuit 101 may prepare additional requests for the scheduler while it waits. If scheduler circuit 262 has selected the request for scheduling, proceed to block 313. At block 313, scheduler circuit 262 decrements counter 106 by the cost of selected request and the method continues to block 314. At block 314, storage controller circuit 101 coordinates processing of the request. If the request is a read, storage controller circuit 101 instructs the associated target to read the associated physical block. Storage controller circuit 101 receives the target data and performs a DMA transfer to RAM and reports completion of the request. If the request is a write, storage controller circuit 101 performs a DMA transfer from RAM and instructs the associated target to write the data transferred from RAM to the associated physical block and reports completion of the request. If the request is an erase, controller 101 instructs the associated target to erase data in the associated physical block and reports completion of the request. At block 316, storage controller circuit 101 refills the counter in the amount of the request cost. In some examples, block 316 does not happen after the completion of a request. Instead, counter 106 is incremented at some interval by a value determined based at least in part on the current temperature or power consumption. For example, if the current operating temperature is well within the performance envelope of the system, storage controller circuit 101 may periodically increment counter 106 by a number approximating or even exceeding the maximum number of requests that could be processed by the targets within a time window. If the current operating temperature exceeds a maximum operating temperature, storage controller circuit 101 may periodically increment counter 106 by a smaller number to limit the number of requests being processed until the temperature falls within the performance envelope of the system.

Figure 4:
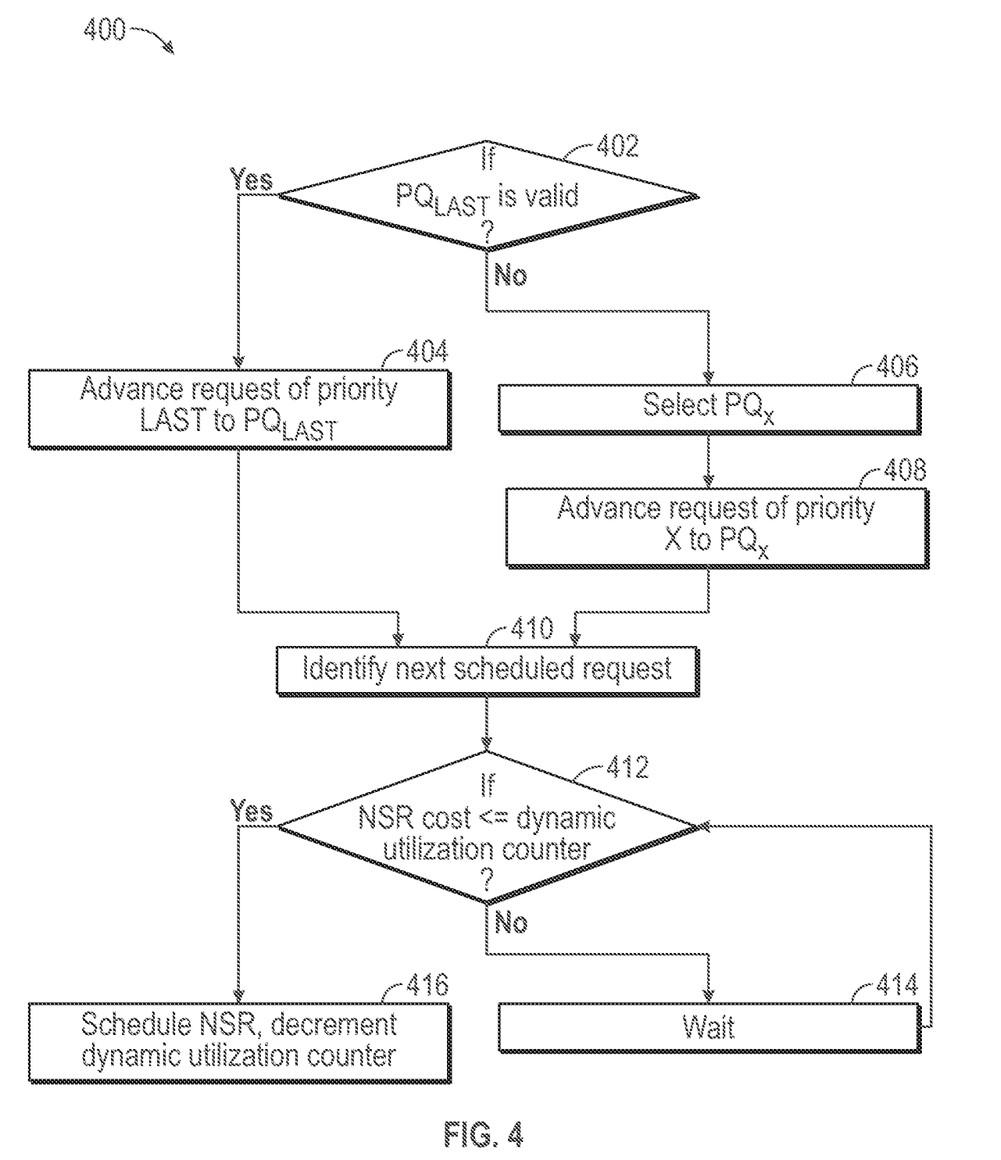
FIG. 4 is a flowchart of a scheduling method, according to examples of the present disclosure.

FIG. 4 is a flowchart of a scheduling method, according to examples of the present disclosure. At block 402, if in the last scheduling cycle a request was scheduled, proceed to block 404 and otherwise proceed to block 406. At block 404, storage controller circuit 101 advances a request of the same priority as the last scheduled request through arbitration circuit 215 into the corresponding priority queue to replenish that queue. At block 406, storage controller circuit 101 specifies a priority by advancing a round robin scheduler through the priorities to evenly fill the priority queue. At block 408, storage controller circuit 101 advances a request of the specified priority through arbitration circuit 215 into the corresponding priority queue to replenish that queue. At block 410, scheduler circuit 262 identifies a priority queue from which to draw the next request to schedule. At block 412, scheduler circuit 262 determines whether counter 260 is greater than the cost of the next request to schedule. If not, scheduler circuit 262 waits a cycle at block 414 and if so scheduler circuit 262 proceeds to block 416. At block 416, scheduler circuit 262 decrements counter 260 by the cost of the request as it schedules the request to be executed.

In some examples, at block 414, the waiting request may be an erase, which takes significant time and power to complete. If storage controller circuit 101 receives a read request for a block on the same target, storage controller circuit 101 may invalidate the erase request and remove it from the queue. In this situation, storage controller circuit 101 may report to the data processing system that the request as cancelled. When block 412 is repeated, scheduler circuit 262 will compare the new cost value to counter 260 and may be able to schedule the request sooner.

Although example embodiments have been described above, other variations and embodiments may be made from this disclosure without departing from the spirit and scope of these embodiments.

What is claimed is:

1. An apparatus, comprising:
    a plurality of channels, each channel having communication lines for controlling a plurality of targets;
    a dynamic utilization counter;
    a storage controller circuit to:
        receive a plurality of data storage requests, each request having a request type,
        associate each request of the received plurality of requests with a corresponding target of the plurality of targets, the corresponding target associated with one of the plurality of channels,
        assign a priority to each request of the received plurality of requests,
        assign a utilization cost to each request of the received plurality of requests based on the request's associated target and request type, and
        queue each request of the plurality of requests for scheduling; and
    a request scheduler circuit to:
        select a first request to be scheduled based on the assigned priority of the first request,
        schedule the first request for processing at a time when the first request assigned utilization cost is less than or equal to a current value of a dynamic utilization counter, and
        debit the dynamic utilization counter by the first request utilization cost.

2. The apparatus of claim 1, comprising a plurality of queues, each corresponding to one priority, wherein:
    the request scheduler circuit uses a weighted round robin algorithm to determine a next one of the plurality of queues from which a next scheduled request will be drawn, and
    the storage controller circuit to replenish the next one of the plurality of queues with a next request from the received plurality of requests having a corresponding priority.

3. The apparatus of claim 2, comprising a second request queued in an original one of the plurality of queues, the storage controller circuit to:
    change the priority of the second request to a new priority,
    assign the second request to a different one of the plurality of queues based on the new priority, and
    invalidate entry the original one of the plurality of queues that correspond to the second request.

4. The apparatus of claim 1, wherein the storage controller circuit to determine a high temperature condition and, responsive to that determination, decrement the dynamic utilization counter.

5. The apparatus of claim 2, comprising an arbitration circuit including:
    a plurality of target selectors, wherein each target selector is associated with one of the plurality of channels, includes an input for each target associated with the corresponding channel, and includes a target selection input common to all target selectors;
    a channel selector including an input coupled to an output of each target selector and including a channel selection input; and
    a router with an input coupled to the output of the channel selector for receiving an incoming one of the plurality of requests and routing that incoming one of the plurality of requests to one of the plurality of queues matching the request priority.

6. The apparatus of claim 5, wherein the arbitration circuit rotates the target selection input and the channel selection input to distribute requests across channels and targets.

7. A circuit-implemented method comprising:
    receiving a plurality of data storage requests, each request having a request type;
    associating each received request of the received plurality of requests with a corresponding target of a plurality of targets, the corresponding target associated with one channel of a plurality of channels;
    assigning a priority to each request of the received plurality of requests;
    assigning a utilization cost to each request of the received plurality of requests based on the request's target and request type;
    queueing each request of the plurality of requests for scheduling;
    selecting a first request of the received plurality of requests to be scheduled based on the priority of the first request,
    scheduling the first request for processing at a time when the first request utilization cost is less than or equal to a current value of a dynamic utilization counter, and
    debiting the dynamic utilization counter by the first request utilization cost.

8. The circuit-implemented method of claim 7, wherein scheduling the first request uses a weighted round robin algorithm to determine a next one of the plurality of queues from which a next scheduled request will be drawn, and comprising:
    replenishing the next one of the plurality of queues with a next request from the received plurality of requests having the same priority as the first request.

9. The circuit-implemented method of claim 8, comprising:
    queueing a second request to be scheduled into a second queue of the plurality of queues based on a priority of the second request;
    changing the priority of the second request to a new priority;
    assigning the second request to a different one of the plurality of queues based on the new priority; and
    removing the second request from the second queue.

10. The circuit-implemented method of claim 8, comprising:
    determining a high temperature condition and responsive determination decrementing the dynamic utilization counter.

11. The circuit-implemented method of claim 8, comprising:
before replenishing the next one of the plurality of queues, selecting a target output and a channel from which to draw a next request to be queued.

12. The circuit-implemented method of claim 11, comprising:
periodically rotating the target output and channel draw requests from all channels and targets.

13. A controller comprising a processor and a memory comprising instructions that when executed on the processor:
receive a plurality of data storage requests, each request having a request type;
associate each request of the received plurality of requests with a corresponding target of a plurality of targets, the corresponding target associated with a corresponding channel of a plurality of channels;
assign a priority to each request of the received plurality of requests;
assign a utilization cost to each request of the received plurality of requests based on the request type;
queue each request of the plurality of requests for scheduling;
select a first request of the received plurality of requests to be scheduled based on the priority of the first request,
schedule the first request for processing at a time when the first request utilization cost is less than or equal to a current value of a dynamic utilization counter, and
debit the dynamic utilization counter by the first request utilization cost.

14. The controller of claim 13, wherein the instructions to schedule a request use a weighted round robin algorithm to determine a next one of the plurality of queues from which a next scheduled request will be drawn, and comprising instructions that when executed on the processor replenish the next one of the plurality of queues with a next request from the received plurality of requests having a corresponding priority.

15. The controller of claim 14, comprising instructions that when executed on the processor:
queue a second request to be scheduled into a second queue of the plurality of queues based on a priority of the second request;
change the priority of the second request to a new priority;
assign the second request to a different one of the plurality of queues based on the new priority; and
remove the second request from the second queue.

16. The controller of claim 13, comprising instructions that when executed on the processor:
determine a high temperature condition and responsive to that determination decrement the dynamic utilization counter.

17. The controller of claim 14, wherein the instructions to queue each request comprise before replenishing the next one of the plurality queues, select a target output and a channel from which to draw a next request to be queued.

18. The controller of claim 17, comprising instructions that when executed on the processor periodically rotate the target output and channel draw requests from all channels and targets.

19. The controller of claim 13, wherein the instructions to receive a plurality of requests into the memory queue requests to be scheduled in a data structure representing multiple priority queues.

20. The controller of claim 13, wherein each target is associated with a type of memory and wherein the instructions to assign a utilization cost to each request of the received plurality of requests is based on the request type and the type of memory for the target corresponding to the request.

* * * * *